US010084298B2

(12) United States Patent
Terwilleger

(10) Patent No.: US 10,084,298 B2
(45) Date of Patent: Sep. 25, 2018

(54) SELF-MEASURING WALL BOX BRACKET

(71) Applicant: David Terwilleger, Granite Shoals, TX (US)

(72) Inventor: David Terwilleger, Granite Shoals, TX (US)

( * ) Notice: Subject to any disclaimer, the term of this patent is extended or adjusted under 35 U.S.C. 154(b) by 0 days.

(21) Appl. No.: 14/794,420

(22) Filed: Jul. 8, 2015

(65) Prior Publication Data

US 2017/0012421 A1    Jan. 12, 2017

(51) Int. Cl.
H02G 3/12 (2006.01)

(52) U.S. Cl.
CPC .............. *H02G 3/125* (2013.01); *H02G 3/12* (2013.01)

(58) Field of Classification Search
CPC ....... Y10S 248/906; H02G 3/125; H02G 3/12
USPC ................... 248/218.4, 27.1, 300; 174/58
See application file for complete search history.

(56) References Cited

U.S. PATENT DOCUMENTS

| | | | |
|---|---|---|---|
| 982,110 A | 1/1911 | Adelman | |
| 1,156,885 A | 10/1915 | Caine | |
| 1,391,844 A | 9/1921 | Moore | |
| 1,897,954 A | 2/1933 | D'Olier | |
| 2,252,953 A | 8/1941 | Walters | |
| 2,480,805 A | 8/1949 | Buckels | |
| 2,644,600 A | 7/1953 | Senif | |
| 2,670,915 A | 3/1954 | Clark | |
| 2,788,187 A | 4/1957 | Cookson et al. | |
| 2,970,713 A | 2/1961 | Kellberg | |
| 2,989,206 A | 6/1961 | McAfee | |
| 3,038,020 A * | 6/1962 | Winter | H02B 1/48 174/53 |
| 3,088,620 A | 5/1963 | Crawford | |
| 3,116,563 A | 1/1964 | Gelbman | |
| 3,436,070 A | 4/1969 | Utley et al. | |
| 3,537,698 A | 11/1970 | Callanan | |
| 3,588,019 A | 6/1971 | Cozeck et al. | |
| 3,730,464 A | 5/1973 | Kelly | |
| 3,767,151 A | 10/1973 | Seal et al. | |
| D231,971 S | 7/1974 | Humlong | |
| 3,928,716 A | 12/1975 | Marrero | |
| 4,202,457 A | 5/1980 | Tansi | |
| 4,399,922 A | 8/1983 | Horsley | |
| 4,533,060 A | 8/1985 | Medlin | |
| 4,561,615 A | 12/1985 | Medlin | |

(Continued)

FOREIGN PATENT DOCUMENTS

WO     WO 9416445 A1 *  7/1994  ............. H02B 1/015

*Primary Examiner* — Muhammad Ijaz
(74) *Attorney, Agent, or Firm* — Sean Christian Connolly

(57) ABSTRACT

Disclosed herein is an apparatus and method for the installation of an electrical outlet between studs at a specified height. The apparatus comprises a body frame with an outlet box mounting frame and ears that extend outwardly from each corner. Each ear has a screw hole, which is precisely positioned, so that the bracket can be used to measure and install an electrical outlet at a specified height. During installation, the bracket is turned sideways, set on the floor and aligned with a wall stud. Next, a screw is secured in the uppermost ear that overlaps the wall stud. Next, the bracket is swung upward until the ears on the opposite side overlap the second wall stud. Next, screws are added to the remaining screw holes and all screws are tightly affixed, so that the apparatus is firmly mounted between the two wall studs at a specified height.

6 Claims, 18 Drawing Sheets

(56) References Cited

U.S. PATENT DOCUMENTS

| | | | |
|---|---|---|---|
| 4,569,458 A | 2/1986 | Horsley | |
| 4,603,789 A * | 8/1986 | Medlin, Sr. | H02G 3/125 220/3.3 |
| 4,635,372 A | 1/1987 | Tande | |
| 4,638,963 A | 1/1987 | Hernandez | |
| 4,645,089 A | 2/1987 | Horsley | |
| 4,688,693 A | 8/1987 | Medlin | |
| 4,703,593 A * | 11/1987 | Smolik | E03C 1/322 248/906 |
| 4,732,356 A | 3/1988 | Medlin | |
| 4,747,506 A | 5/1988 | Stuchlik | |
| 4,757,967 A * | 7/1988 | Delmore | E04B 2/7453 248/218.4 |
| 4,787,587 A | 11/1988 | Deming | |
| 4,790,505 A | 12/1988 | Rose et al. | |
| 4,793,069 A | 12/1988 | McDowell | |
| 4,796,844 A | 1/1989 | Barker | |
| 4,832,297 A | 5/1989 | Carpenter | |
| 4,943,022 A | 7/1990 | Rinderer | |
| 4,964,525 A * | 10/1990 | Coffey | H02G 3/125 220/3.9 |
| 4,967,990 A * | 11/1990 | Rinderer | H02G 3/125 220/3.9 |
| 4,978,092 A | 12/1990 | Nattel | |
| 5,005,792 A | 4/1991 | Rinderer | |
| 5,034,567 A | 7/1991 | Mohr | |
| 5,060,891 A | 10/1991 | Nagy et al. | |
| 5,263,676 A | 11/1993 | Medlin et al. | |
| 5,295,644 A | 3/1994 | Ferguson | |
| 5,330,137 A | 7/1994 | Oliva | |
| 5,598,998 A | 2/1997 | Lynn | |
| 5,615,850 A | 4/1997 | Cloninger | |
| 5,646,371 A | 7/1997 | Fabian | |
| 5,692,357 A | 12/1997 | McCain | |
| 5,699,221 A | 12/1997 | O'Leary et al. | |
| 5,820,317 A | 10/1998 | Van Troba | |
| 5,883,332 A | 3/1999 | Collard | |
| 5,921,522 A | 7/1999 | Weber | |
| 5,927,667 A * | 7/1999 | Swanson | H02G 1/00 174/54 |
| 5,931,425 A * | 8/1999 | Oliva | H02G 3/125 174/58 |
| 5,965,844 A * | 10/1999 | Lippa | H02G 3/14 174/481 |
| 6,098,939 A | 8/2000 | He | |
| 6,098,945 A | 8/2000 | Korcz | |
| 6,147,306 A * | 11/2000 | Wilkins | H02G 3/126 174/58 |
| 6,188,022 B1 | 2/2001 | He | |
| 6,209,836 B1 | 4/2001 | Swanson | |
| 6,345,800 B1 | 2/2002 | Herst et al. | |
| 6,484,979 B1 * | 11/2002 | Medlin, Jr. | H02G 3/125 248/205.1 |
| 6,508,445 B1 | 1/2003 | Rohmer | |
| 6,590,155 B2 | 7/2003 | Vrame et al. | |
| 6,666,419 B1 * | 12/2003 | Vrame | H02G 3/125 248/200.1 |
| 6,765,146 B1 * | 7/2004 | Gerardo | H02G 1/00 174/50 |
| 6,824,298 B2 | 11/2004 | Childs | |
| 6,871,827 B2 | 3/2005 | Petak et al. | |
| 6,940,016 B1 | 9/2005 | Cornett et al. | |
| 7,036,782 B2 * | 5/2006 | Cheatham | H02G 3/125 248/298.1 |
| 7,053,300 B2 | 5/2006 | Denier et al. | |
| 7,087,837 B1 * | 8/2006 | Gretz | H02G 3/121 174/53 |
| 7,112,743 B2 | 9/2006 | Hull et al. | |
| 7,154,040 B1 | 12/2006 | Tompkins | |
| 7,208,679 B2 | 4/2007 | Phillips | |
| 7,312,396 B1 * | 12/2007 | Gorman | H02G 3/125 174/480 |
| 7,381,907 B1 | 6/2008 | Frusco | |
| 7,434,326 B2 | 10/2008 | Gifford | |
| 7,472,875 B2 | 1/2009 | Rinderer | |
| 7,521,631 B2 * | 4/2009 | Dinh | H02G 3/125 174/480 |
| 7,842,884 B2 | 11/2010 | Johnson | |
| 7,845,089 B1 | 12/2010 | Lavalle | |
| 7,902,457 B2 | 3/2011 | Johnson | |
| 8,177,176 B2 | 5/2012 | Nguyen et al. | |
| 8,193,446 B1 | 6/2012 | Taylor | |
| 8,297,579 B1 | 10/2012 | Gretz | |
| 8,371,465 B2 | 2/2013 | Denier | |
| 8,403,289 B1 * | 3/2013 | Rinderer | H02G 3/126 174/480 |
| 8,455,772 B2 | 6/2013 | Phillips | |
| 8,702,047 B2 | 4/2014 | Nuernberger et al. | |
| 8,912,440 B2 | 12/2014 | Petak et al. | |
| D722,029 S * | 2/2015 | Hagarty | D13/152 |
| 9,397,491 B2 * | 7/2016 | Birli | H02G 3/125 |
| 9,502,874 B2 * | 11/2016 | Gagne | H02G 3/086 |
| 9,825,446 B2 * | 11/2017 | Korcz | H02G 3/125 |
| 2002/0050547 A1 * | 5/2002 | Medlin, Sr. | H02G 3/125 248/205.1 |
| 2002/0184778 A1 | 12/2002 | Yrazabal | |
| 2004/0222006 A1 * | 11/2004 | Gerardo | H02G 1/00 174/58 |
| 2005/0001123 A1 * | 1/2005 | Cheatham | H02G 3/125 248/298.1 |
| 2005/0176278 A1 * | 8/2005 | Cheatham | H02G 3/086 439/92 |
| 2006/0226318 A1 | 10/2006 | D'Amico | |
| 2006/0237601 A1 * | 10/2006 | Rinderer | H02G 3/125 248/200.1 |
| 2007/0084617 A1 * | 4/2007 | Dinh | H02G 3/125 174/58 |
| 2009/0014209 A1 | 1/2009 | Forbis | |
| 2010/0006723 A1 * | 1/2010 | Yan | H02G 3/125 248/201 |
| 2013/0292169 A1 | 11/2013 | Amar | |
| 2014/0103180 A1 * | 4/2014 | Birli | H02G 3/125 248/274.1 |
| 2016/0087416 A1 * | 3/2016 | Vrame | H02G 3/125 174/50 |
| 2016/0099555 A1 * | 4/2016 | Nikayin | H02G 3/126 248/74.2 |
| 2016/0241008 A1 * | 8/2016 | Korcz | H02G 3/125 |
| 2016/0360629 A1 * | 12/2016 | Witherbee | H02G 3/125 |
| 2017/0012421 A1 * | 1/2017 | Terwilleger | H02G 3/125 |
| 2017/0256928 A1 * | 9/2017 | Korcz | H02G 3/125 |
| 2018/0048134 A1 * | 2/2018 | Korcz | H02G 3/125 |

* cited by examiner

SELF-MEASURING WALL BOX BRACKET

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention is in the technical field of brackets. More particularly, the preferred embodiments of the present invention relate generally to brackets made of a singular construction. More particularly, the preferred embodiments of the present invention relate generally to brackets for supporting electrical outlets. More particularly, the preferred embodiments of the present invention relate generally to brackets that span wall studs. More particularly, the preferred embodiments of the present invention relate generally to wall brackets, which set electrical outlets at specific heights.

2. Description of the Related Art

The broad concept of brackets for supporting electrical outlets is known. These brackets usually require taking time consuming measurements to install, and measurement errors can contribute to reworking that may unnecessarily add time and expense to the installation of a single bracket.

It is also known to use brackets made of a singular construction. However, using a singular construction usually has more benefits in the manufacturing process of the brackets and do not aid in the installation of the brackets.

Brackets that span wall studs are also known. However, these inventions usually involve brackets that are adjustable to fit various stud spacing or brackets that are narrowly construed to facilitate the mounting of other equipment.

It is also known to use tools for positioning electrical boxes. However, these inventions are usually intended to hold the electrical box in place while it is affixed to a bracket or other supporting means, such as directly affixing the electrical box to a wall stud.

It is also known to use tools for placing electrical outlets at specific heights. However, these inventions are usually jigs, which are separate from the device that ultimately supports the electrical boxes.

It is also known to use wall brackets, which set electrical outlets at specific heights. However, these inventions usually require a substantial amount of additional material to be added to a wall bracket, such as a kickstand, which increases the cost of the bracket and is essentially unused once the wall bracket is installed.

SUMMARY OF THE INVENTION

Standard Building Codes and Electrical Codes require placement of electrical boxes or outlet boxes at specified heights. Similarly, wall studs are required to conform to standard spacing between the studs. The broad embodiments of the present invention relate generally to a wall bracket for mounting an electrical outlet at a specified height between two wall studs in which the bracket itself is precisely dimensioned so that it can be used to determine the proper mounting height of the electrical box, as well as, to a method of using the wall bracket to mount an electrical out at a specified height between two wall studs.

In the more preferred embodiments, the present invention relates to a wall bracket for mounting an electrical outlet at a specified height between two wall studs, which are spaced apart by a standard distance as defined by Standard Building Codes, in which the bracket itself is precisely dimensioned so that it can be used to determine the proper mounting height of the electrical box by turning the wall bracket on its side, placing it onto the ground, and affixing it in a swivelable manner to a first wall stud, and then swinging the wall bracket upwards and affixing it to an adjacent wall stud. Once affixed between the two wall studs, mounting an electrical box to the wall bracket sets the electrical box at a height specified by Standard Building Codes and Electrical Codes.

In the most preferred embodiments, the present invention relates to an apparatus and method for mounting an electrical outlet at a specified height between two wall studs with specified spacing in which the bracket itself is precisely dimensioned so that it can be used to determine the proper mounting height of the electrical box, which is a singular construction, and which comprises a rectangular body frame with an outlet box mounting frame and ears that extend outwardly from each corner. Each ear further comprises a screw hole, which is precisely positioned relative to the edges of the bracket, so that an electrical outlet may be installed at a specified height. To install an electrical box between two wall studs, the Self-Measuring Wall Box Bracket is first turned sideways so that the bottom edge of the body frame is vertical and a side of the bracket, which is now horizontal, is set on the floor. Next, the vertical bottom edge of the Self-Measuring Wall Box Bracket is aligned with a wall stud with the body frame positioned between the wall studs between which the outlet box is to be mounted. Slits located at the base of each ear on the top and bottom edges of the body frame help an installer to align the vertical bottom edge of the sideways bracket with the wall stud. Next, a screw is loosely secured through the screw hole in the uppermost ear that overlaps the wall stud. Next, the bracket is swung upward, pivoting around the loosely secured screw, until the ears on the opposite side of the loosely secured screw overlaps the second wall stud. Next, the slits are used to assure the horizontal alignment of the bracket relative to the second wall stud, and screws are added to the remaining screw holes and tightly affixed, along with the initial screw, so that the Self-Measuring Wall Box Bracket is firmly mounted between the two wall studs. The position of the ears and screw holes relative to the mounting frame are precisely set so that an electrical box mounted within the mounting frame is positioned at the required height when the Self-Measuring Wall Box Bracket is properly mounted. The Self-Measuring Wall Box Bracket invention provides a low cost apparatus, which facilitates rapid and convenient installation of electric boxes at specified heights between standard wall studs.

BRIEF DESCRIPTION OF THE DRAWING

Illustrative and preferred embodiments of the present invention are shown in the accompanying drawings in which.

DETAILED DESCRIPTION OF THE PREFERRED EMBODIMENTS

For the purpose of illustration, the present invention is shown in the most preferred embodiment of a wall bracket for mounting an electrical outlet at a specified height between two wall studs in which the bracket itself is precisely dimensioned so that it can be used to determine the proper mounting height of the electrical box. Methods of using the wall bracket are also illustrated. These embodiments are not intended to limit the scope of the present invention.

Figure 1:
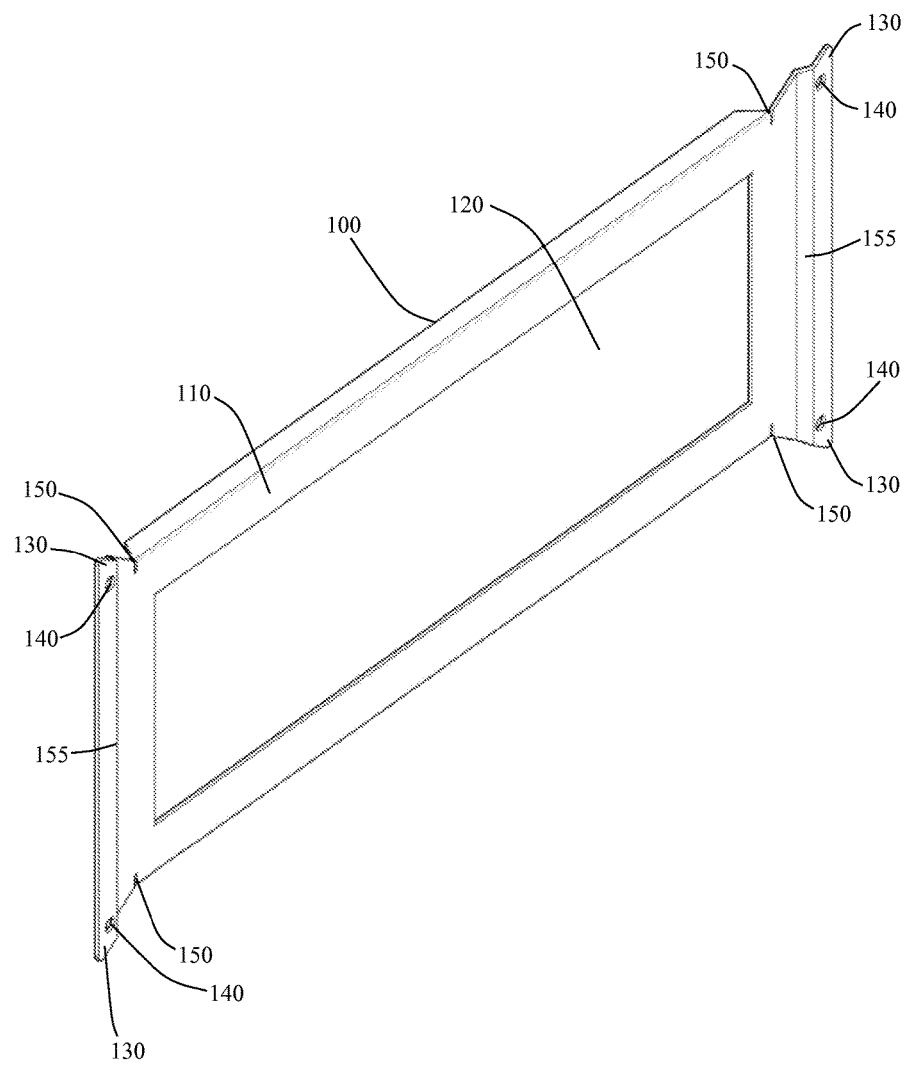
FIG. 1 is a perspective view of an apparatus of the present invention.
Figure 2:
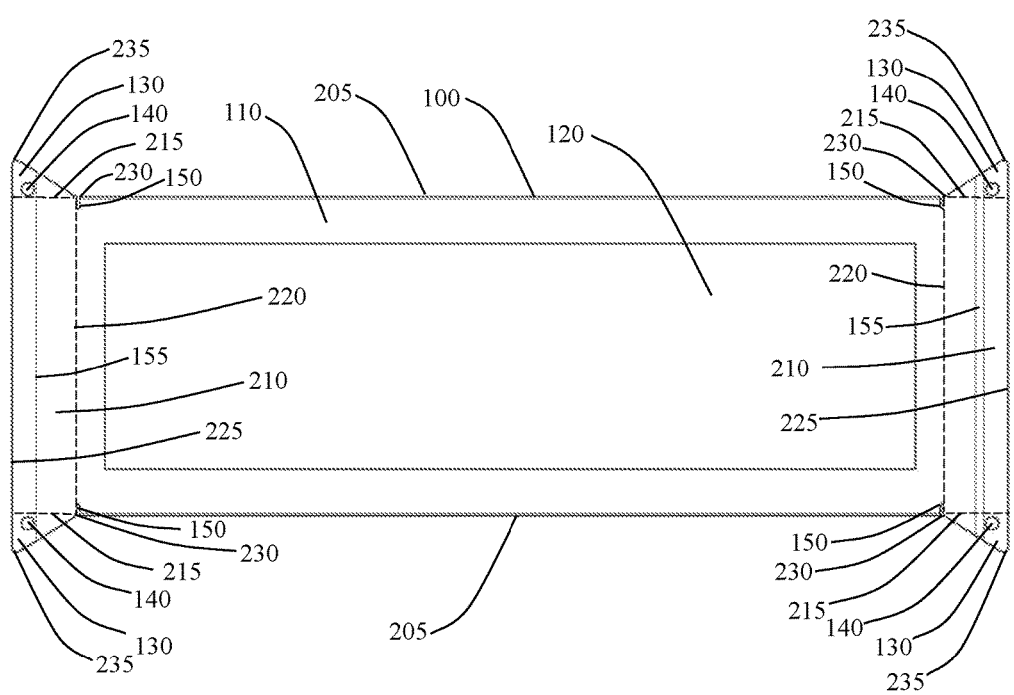
FIG. 2 is a front view of an apparatus of FIG. 1.
Figure 3:
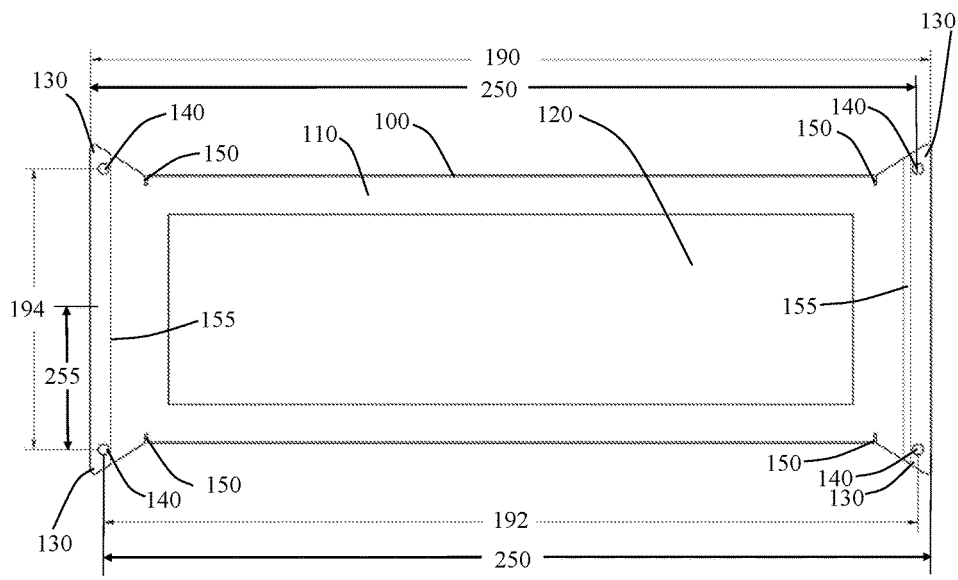
FIG. 3 is a front view of an apparatus of FIG. 1, which indicates the critical dimensions of the apparatus.
Figure 4:
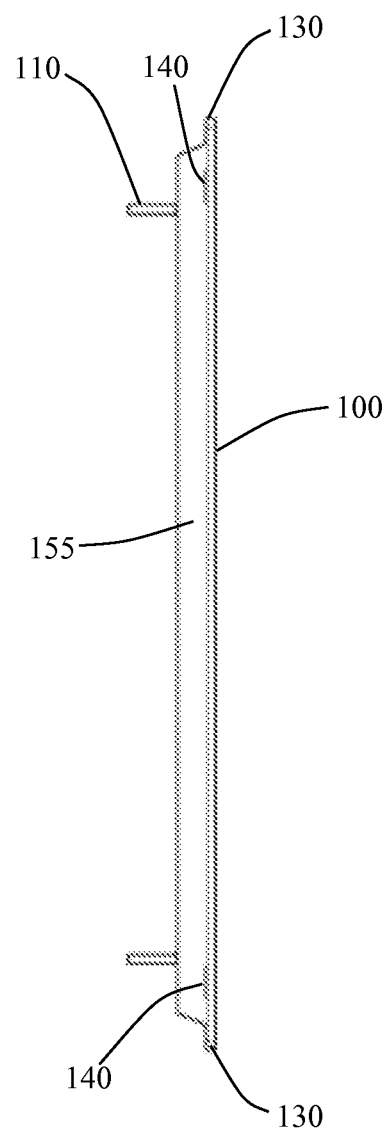
FIG. 4 is a side view of an apparatus of FIG. 1.
Figure 5:
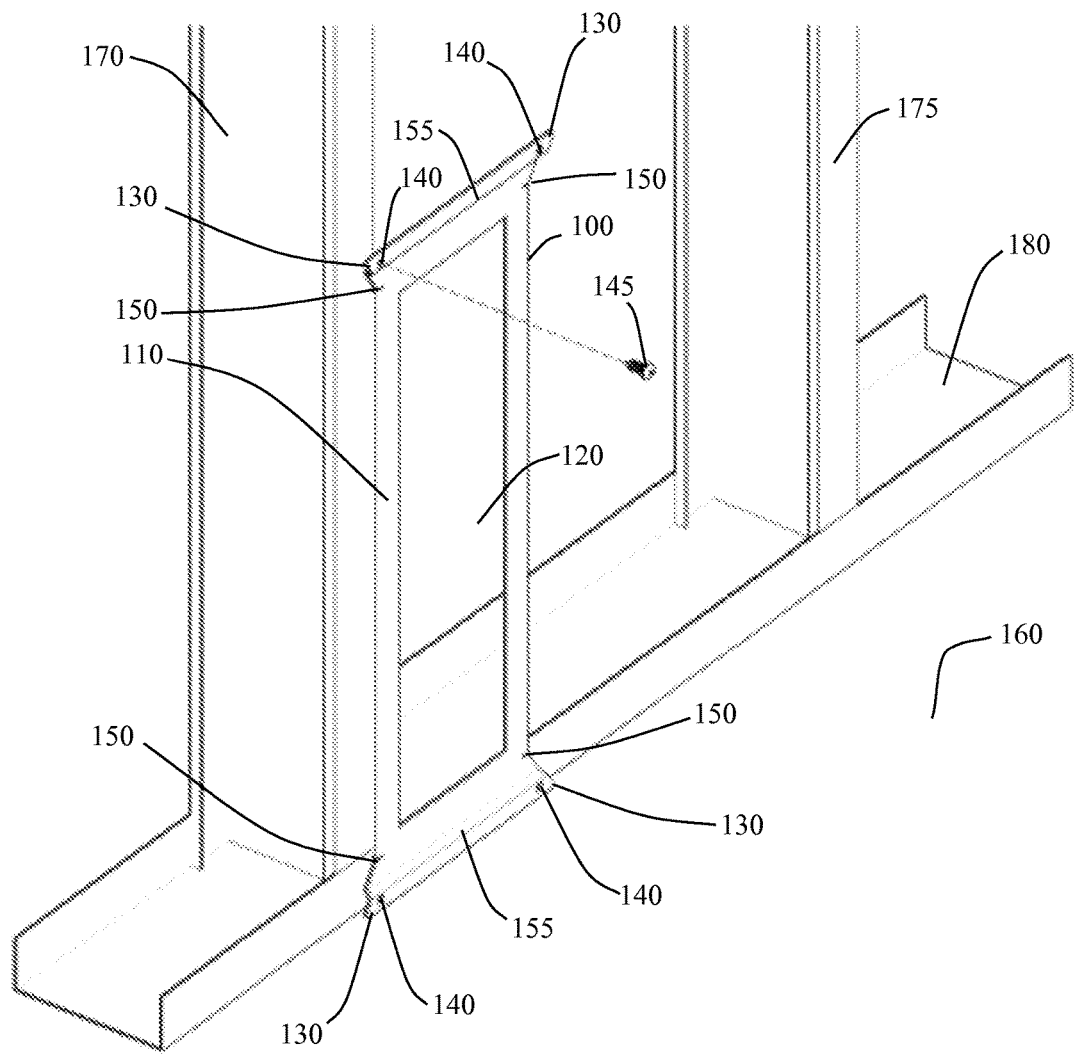
FIG. 5 is a perspective view of an apparatus of FIG. 1 in the process of being installed.
Figure 6:
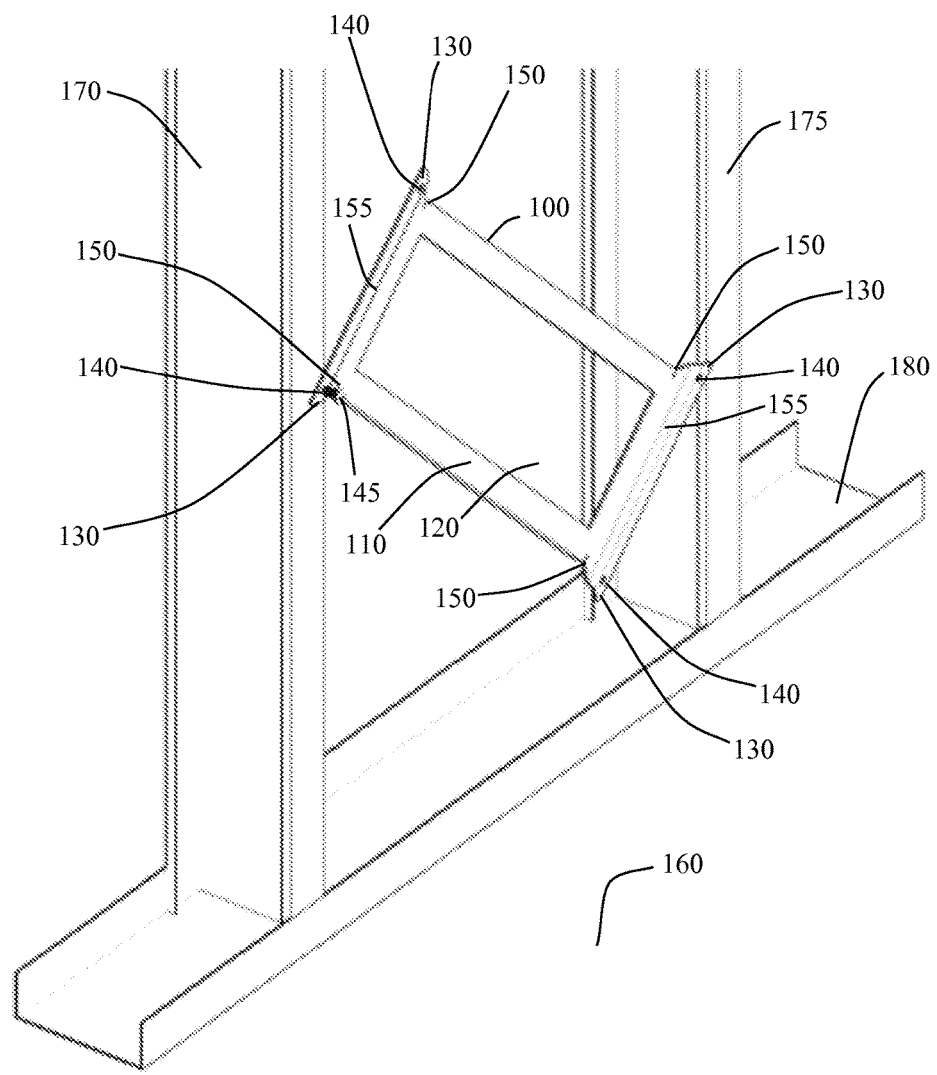
FIG. 6 is a perspective view of an apparatus of FIG. 1 in the process of being installed.
Figure 7:
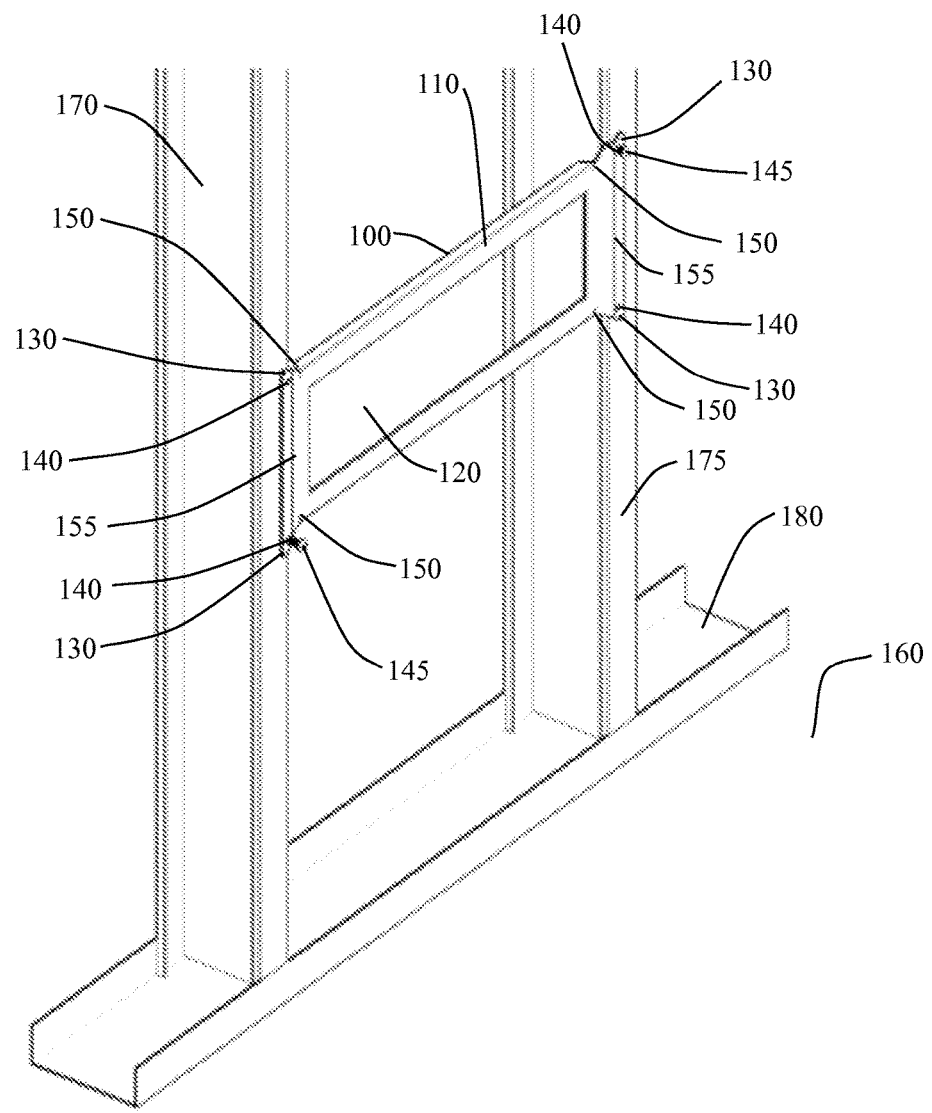
FIG. 7 is a perspective view of an apparatus of FIG. 1 in the process of being installed.
Figure 8:
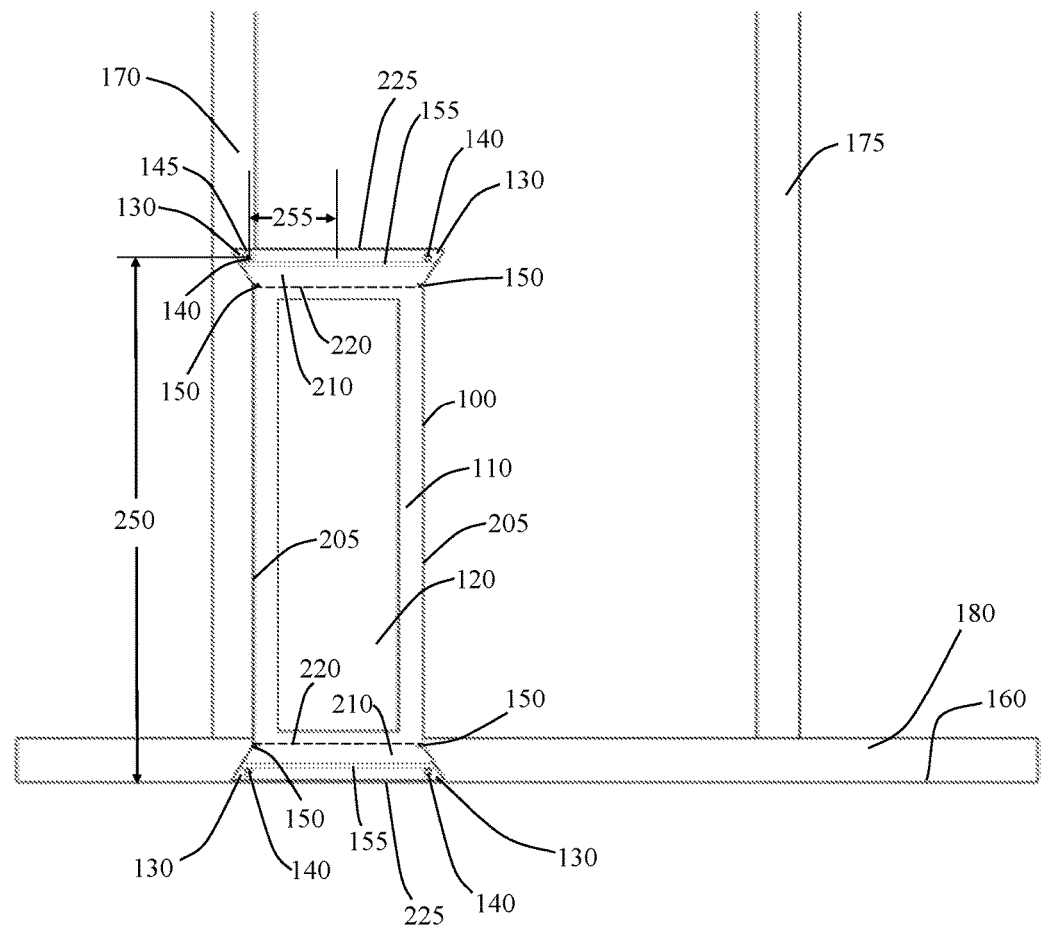
FIG. 8 is a front view of an apparatus of FIG. 1 in the process of being installed.
Figure 9:
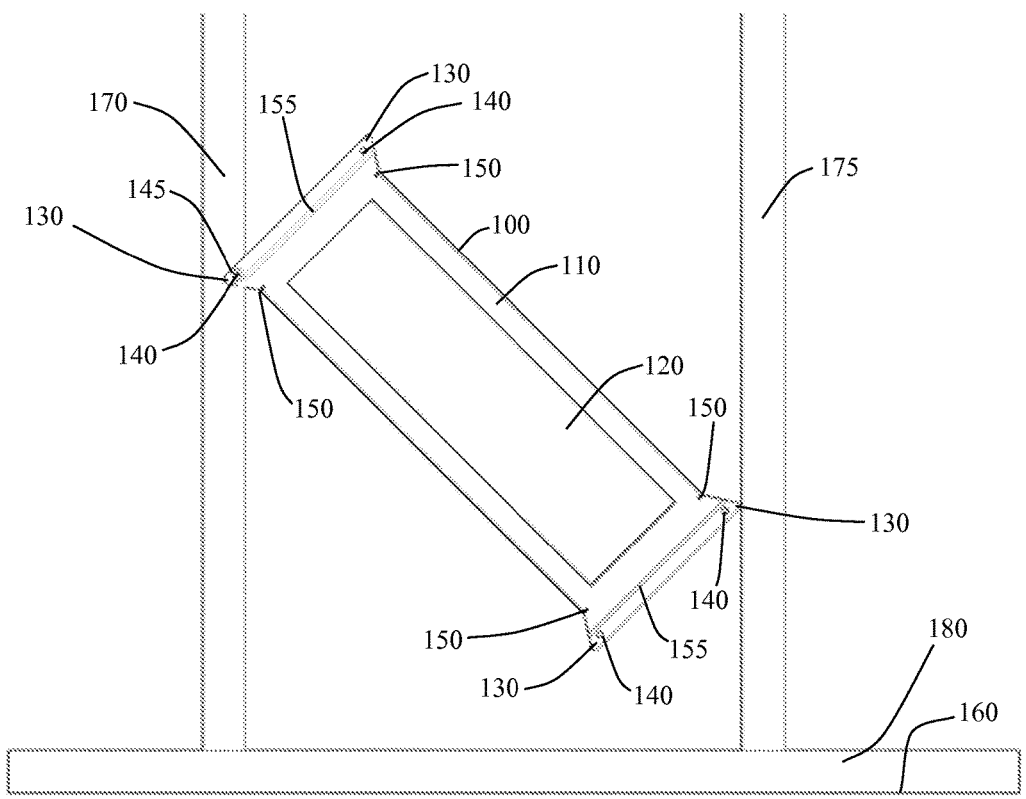
FIG. 9 is a front view of an apparatus of FIG. 1 in the process of being installed.
Figure 10:
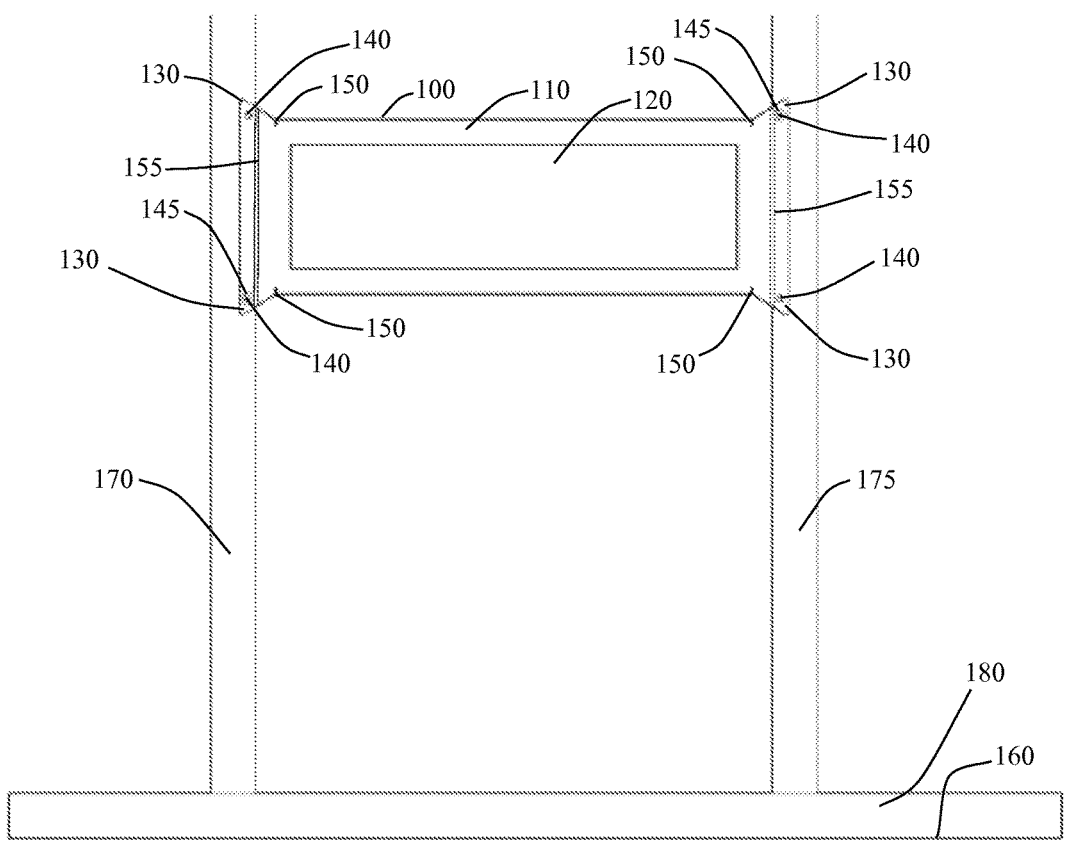
FIG. 10 is a front view of an apparatus of FIG. 1 in the process of being installed.
Figure 11:
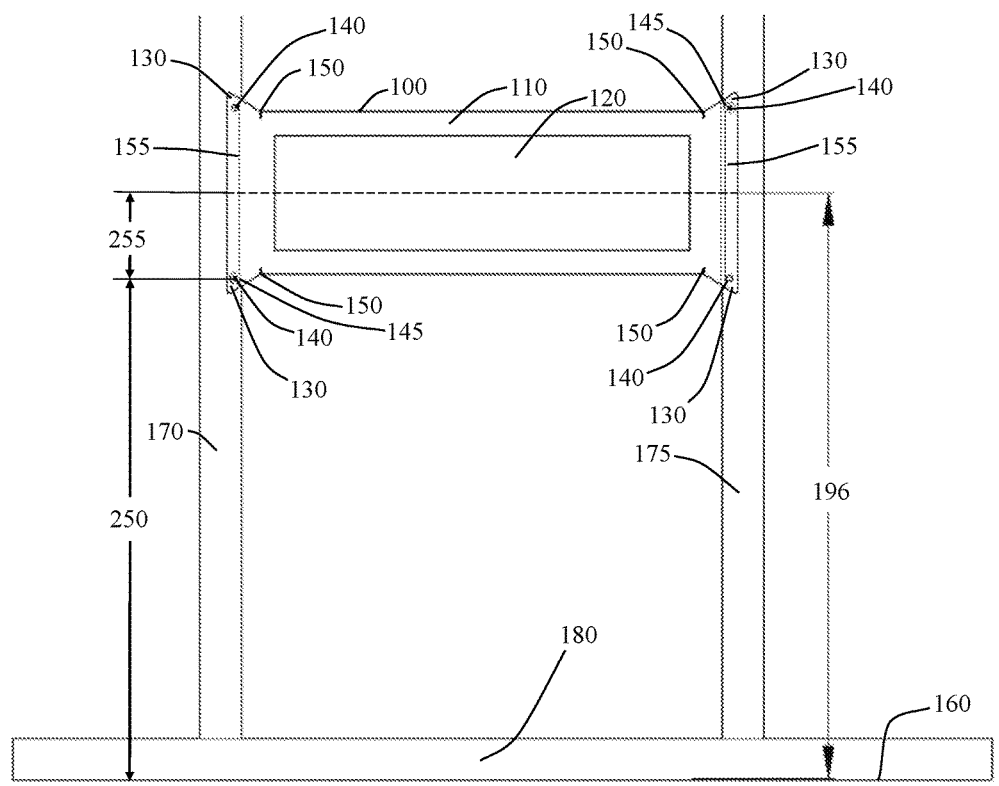
FIG. 11 is a front view of an installed apparatus of FIG. 1, which displays critical dimensions of the installation.
Figure 12:
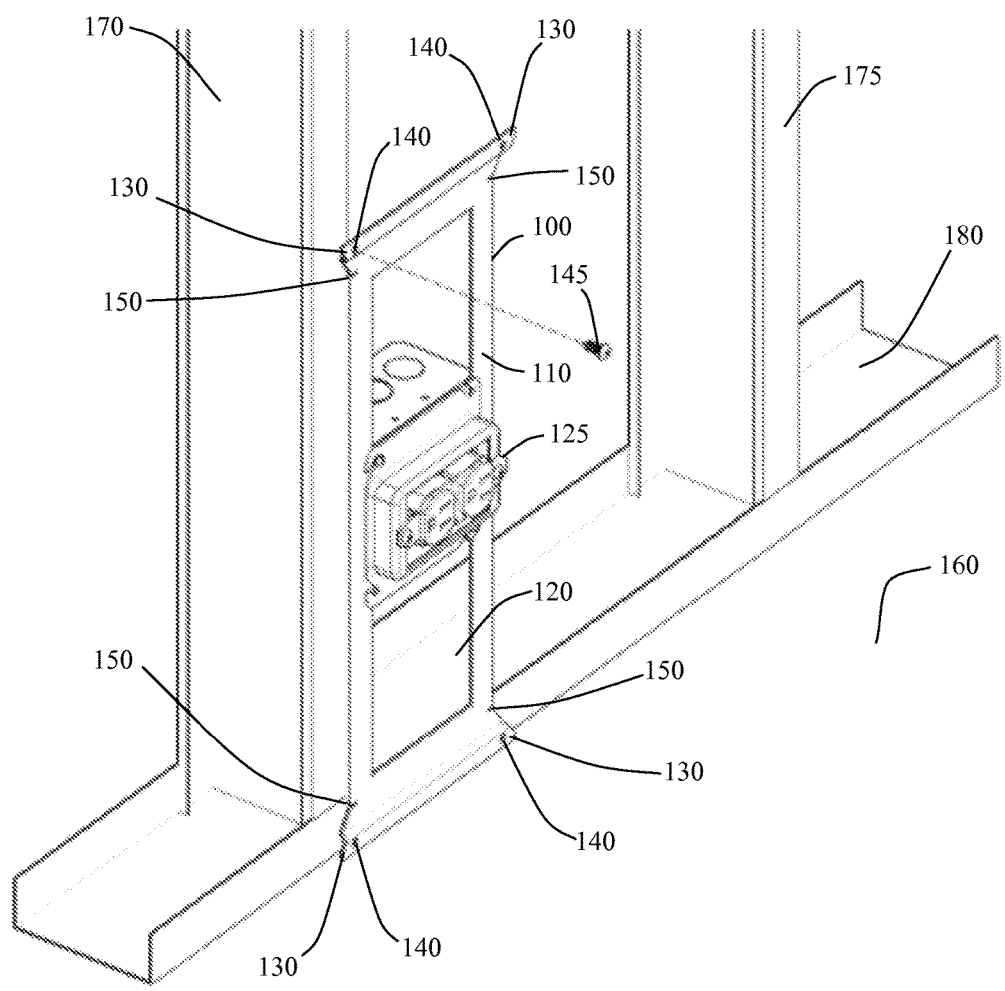
FIG. 12 is a perspective view of an apparatus of FIG. 1 in the process of being installed with an electric outlet mounted on the apparatus.
Figure 13:
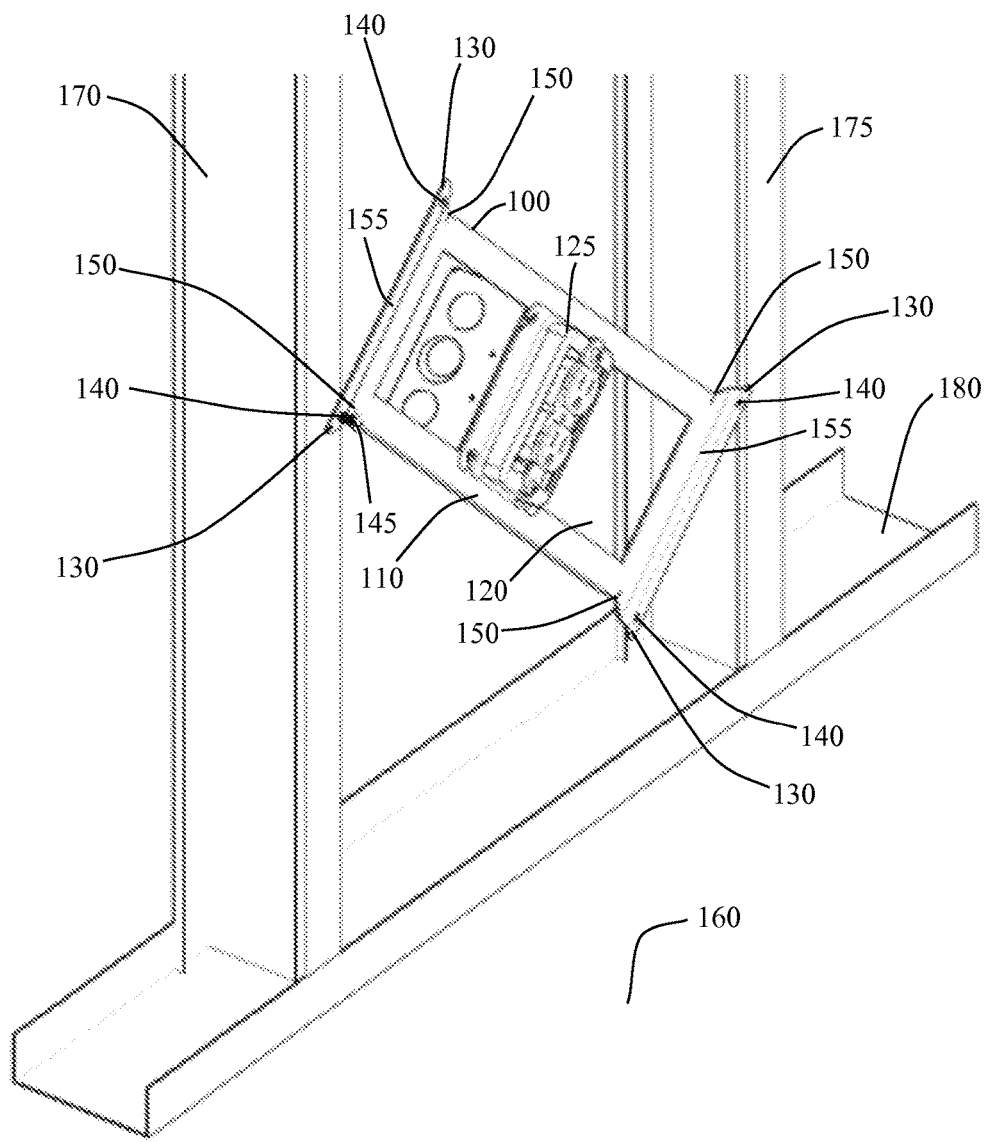
FIG. 13 is a perspective view of an apparatus of FIG. 1 in the process of being installed with an electric outlet mounted on the apparatus.
Figure 14:
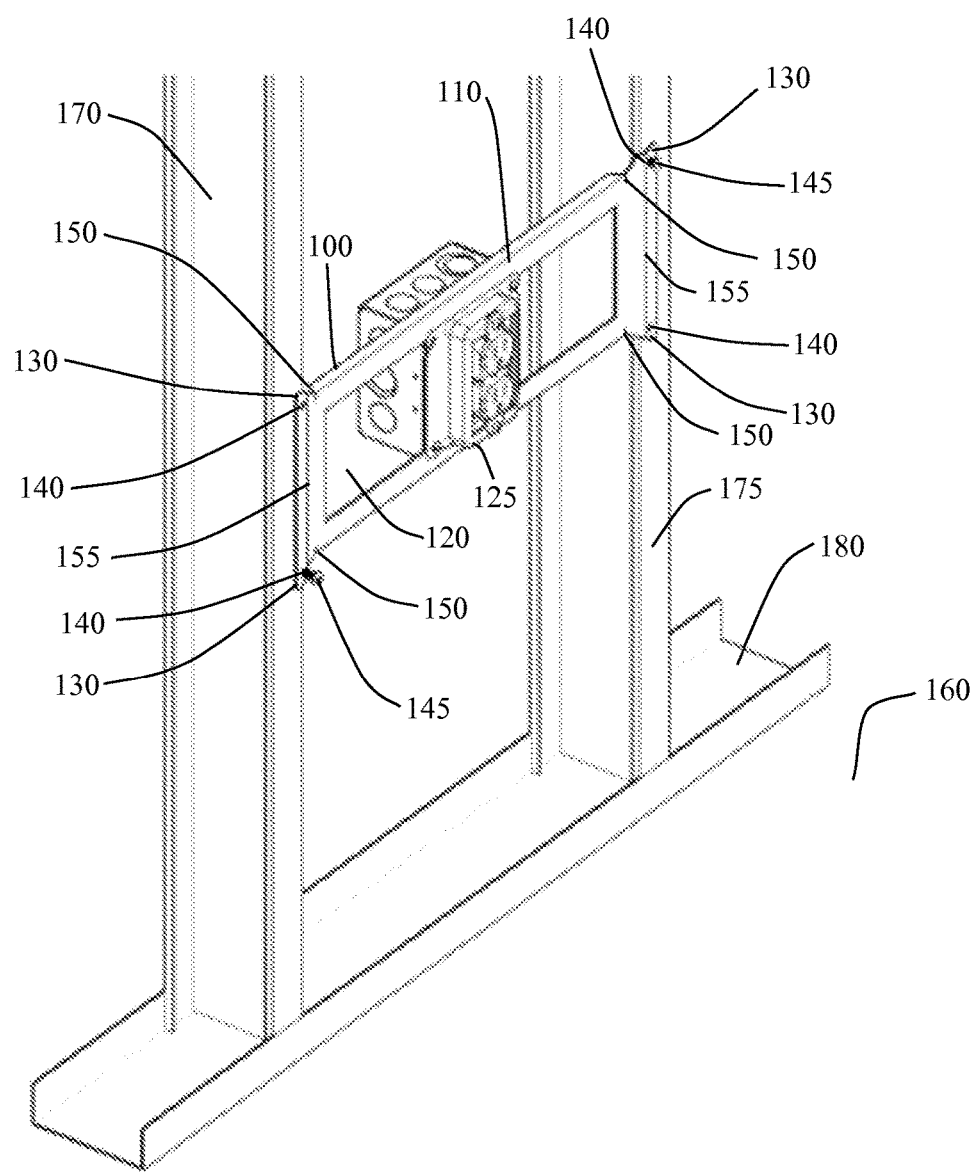
FIG. 14 is a perspective view of an apparatus of FIG. 1 in the process of being installed with an electric outlet mounted on the apparatus.
Figure 15:
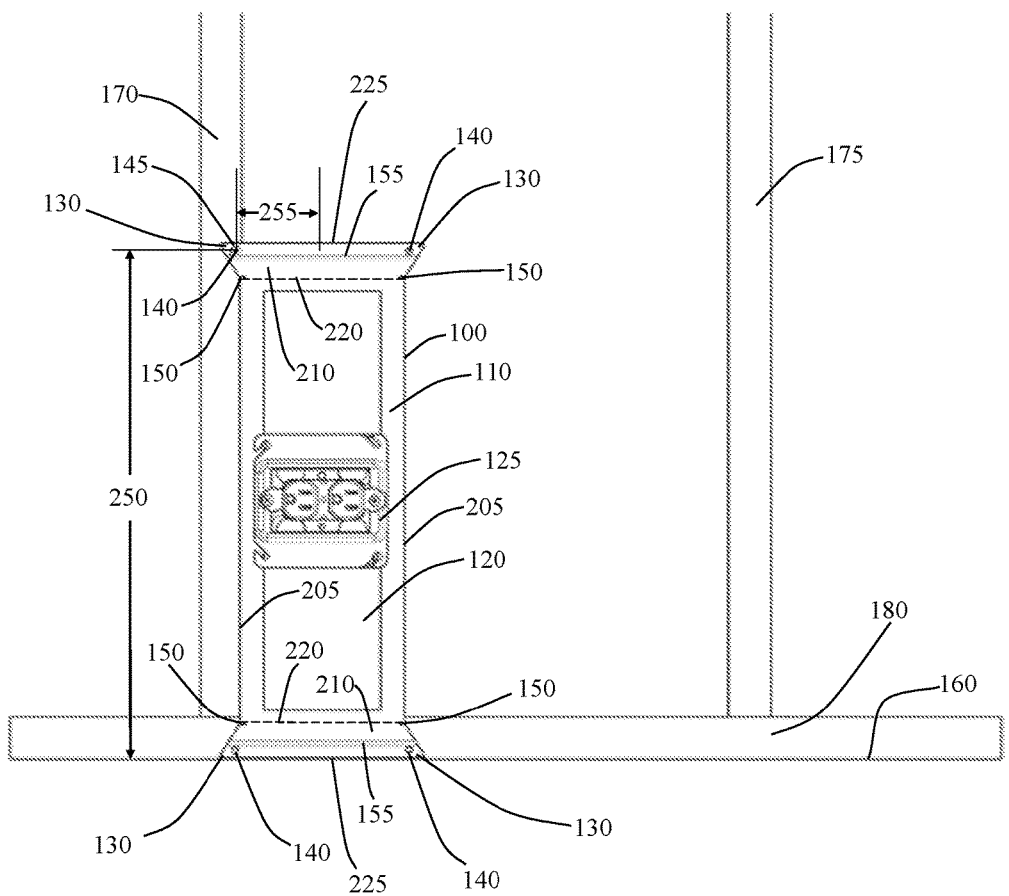
FIG. 15 is a front view of an apparatus of FIG. 1 in the process of being installed with an electric outlet mounted on the apparatus.
Figure 16:
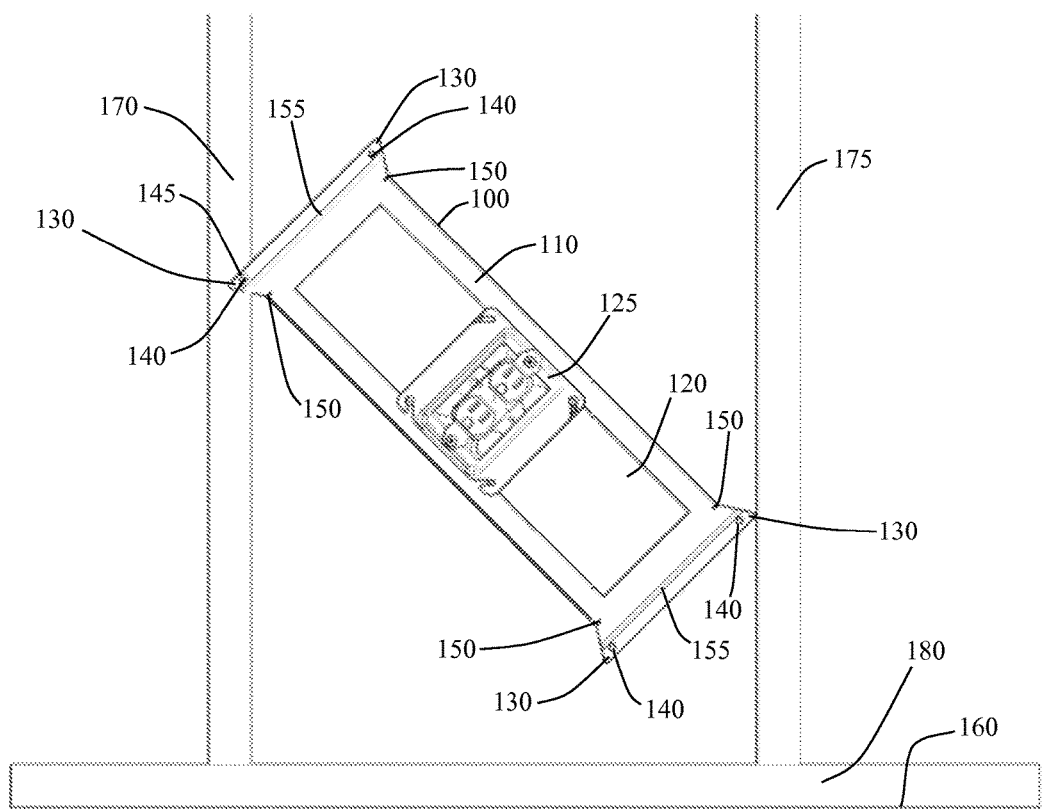
FIG. 16 is a front view of an apparatus of FIG. 1 in the process of being installed with an electric outlet mounted on the apparatus.
Figure 17:
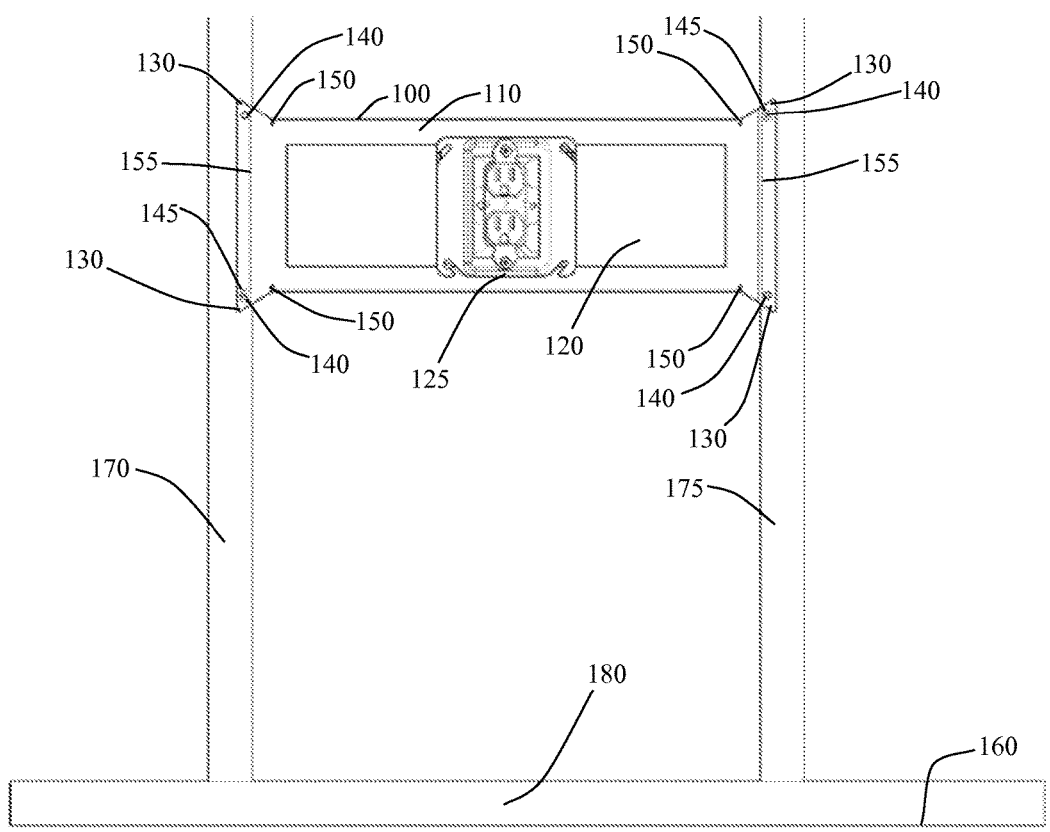
FIG. 17 is a front view of an apparatus of FIG. 1 in the process of being installed with an electric outlet mounted on the apparatus.
Figure 18:
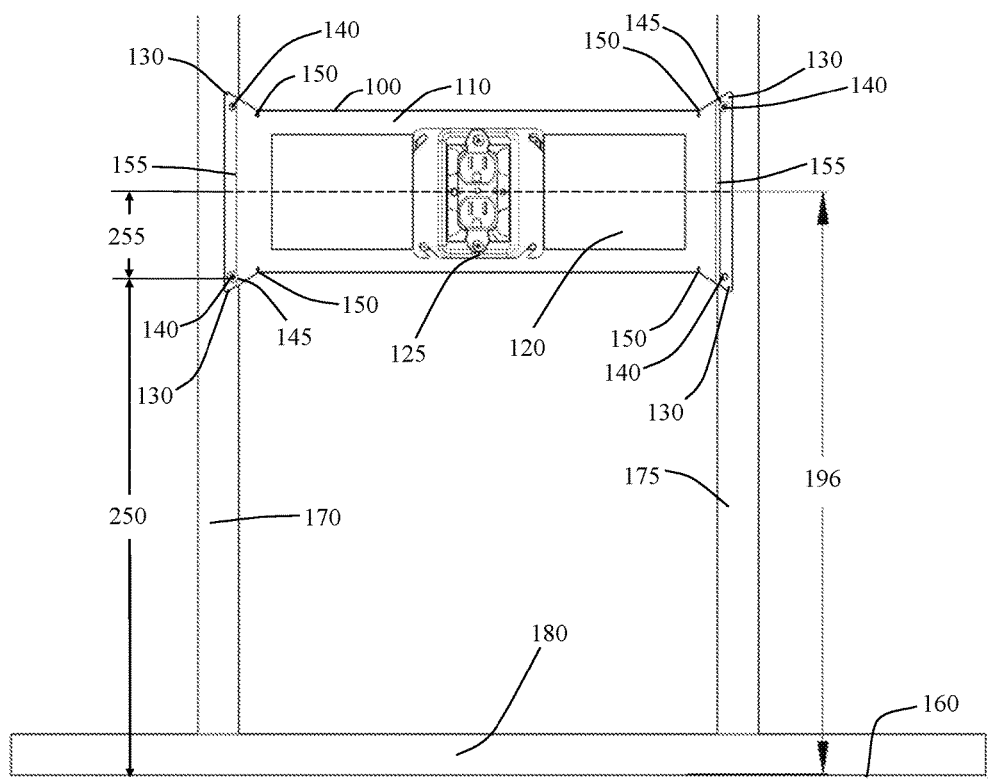
FIG. 18 is a front view of an installed apparatus of FIG. 1 with an electric outlet mounted on the apparatus, which displays critical dimensions of the installation.

The Self-Measuring Wall Box Bracket invention was developed in part to allow for rapid installation of an electrical outlet between adjacent wall studs, which are set apart at a specified distance defined by standard building codes, and at a specified height, which is defined by standard building and electrical codes, while keeping the cost of materials low. Referring now to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17 and FIG. 18, a Self-Measuring Wall Box Bracket 100 is shown. FIG. 1 illustrates a perspective view of a Self-Measuring Wall Box Bracket. FIG. 2 depicts a front view of a Self-Measuring Wall Box Bracket 100. FIG. 3 shows a front view of a Self-Measuring Wall Box Bracket 100 and indicates the critical width dimension 190, the critical horizontal screw hole spacing dimension 192, and the critical vertical screw hole spacing dimension 194, of the apparatus. FIG. 4 displays a side view of a Self-Measuring Wall Box Bracket 100. FIG. 5 shows a perspective view of a Self-Measuring Wall Box Bracket 100 in the first step of the process of being installed between a first wall stud 170 and a second wall stud 175, which is adjacent to the first wall stud 170. FIG. 6 depicts a perspective view of a Self-Measuring Wall Box Bracket 100 in the process of being installed between a first wall stud 170 and a second wall stud 175. FIG. 7 illustrates a perspective view of a Self-Measuring Wall Box Bracket 100 in its final position during the process of being installed between a first wall stud 170 and a second wall stud 175. FIG. 8 demonstrates a front view of a Self-Measuring Wall Box Bracket 100 in the first step of the process of being installed between a first wall stud 170 and a second wall stud 175. FIG. 9 shows a front view of a Self-Measuring Wall Box Bracket 100 in the process of being installed between a first wall stud 170 and a second wall stud 175. FIG. 10 displays a front view of a Self-Measuring Wall Box Bracket 100 in its final position during the process of being installed between a first wall stud 170 and a second wall stud 175. FIG. 11 depicts a front view of a Self-Measuring Wall Box Bracket 100 in its final position during the process of being installed between a first wall stud 170 and a second wall stud 175 and indicates the critical specified outlet height dimension 196. FIG. 12 shows a perspective view of a Self-Measuring Wall Box Bracket 100 with a mounted electrical outlet box 125 in the first step of the process of being installed between a first wall stud 170 and a second wall stud 175. FIG. 13 illustrates a perspective view of a Self-Measuring Wall Box Bracket 100 with a mounted electrical outlet box 125 in the process of being installed between a first wall stud 170 and a second wall stud 175. FIG. 14 depicts a perspective view of a Self-Measuring Wall Box Bracket 100 with a mounted electrical outlet box 125 in its final position during the process of being installed between a first wall stud 170 and a second wall stud 175. FIG. 15 shows a front view of a Self-Measuring Wall Box Bracket 100 with a mounted electrical outlet box 125 in the first step of the process of being installed between a first wall stud 170 and a second wall stud 175. FIG. 16 demonstrates a front view of a Self-Measuring Wall Box Bracket 100 with a mounted electrical outlet box 125 in the process of being installed between a first wall stud 170 and a second wall stud 175. FIG. 17 depicts a front view of a Self-Measuring Wall Box Bracket 100 with a mounted electrical outlet box 125 in its final position during the process of being installed between a first wall stud 170 and a second wall stud 175. FIG. 18 displays a front view of a Self-Measuring Wall Box Bracket 100 with a mounted electrical outlet box 125 in its final position during the process of being installed between a first wall stud 170 and a second wall stud 175 and indicates the critical specified outlet height dimension 196.

Referring still to the most preferred embodiment of the invention, in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18, the Self-Measuring Wall Box Bracket 100 comprises a singular construction with a rectangular body frame 110, an outlet box mounting frame 120 comprising a rectangular space within the rectangular body frame 110, and two trapezoidal ends 210. As shown in the figures, the rectangular body frame 110 comprises two long sides 205 and two short sides 220 with the short sides 220 being shorter than the long sides 205, coplanar with said long sides 205, perpendicular to the long sides 205, spanning the distance between the two long sides 205, and comprising a short vertex 230 as a point on either end of the short sides 220. Each trapezoidal end 210 distends outwardly from a short side 220 of the rectangular body frame 110. Each trapezoidal end 210 comprises one short side 220 of the rectangular body frame 110, a long trapezoidal side 225, an altitude 215, and two ears 130. The long trapezoidal side 225 is longer than the short side 220, parallel to the short side 220, and comprises a long vertex 235 as a point on either end of the long trapezoidal side 225. The altitude 215 comprises the distance between the short side 220 and the long trapezoidal side 225. Each ear 130 comprises an area spanning a long vertex 235, a short vertex 230 and the point at which the altitude 215 extending from the short vertex 230 intersects the long trapezoidal side 225, on the same side of a trapezoidal end 210. Each trapezoidal end 210 further comprises a depth fold 155, which allows an electrical outlet box 125 to be installed flush with a wall that is supported by a first wall stud 170 and a second wall stud 175. Each ear 130 further comprises an alignment slit 150, which is located at the base of the ear 130, and a screw hole 140, which is precisely positioned relative to the edges of the bracket, so that an electrical outlet may be installed at a specified height, such as the critical specified outlet height dimension 196. The critical dimensions of the Self-Measuring Wall Box Bracket 100 enable the rapid installation of an electrical outlet between adjacent wall studs, which are set apart at a specified distance defined by standard building codes, and at a specified height, which is defined by standard building and electrical codes. The critical width dimension 190 is the horizontal distance between the outer edges of the Self-Measuring Wall Box Bracket 100. The critical horizontal screw hole spacing dimension 192 is the horizontal distance between the centers of the screw holes 140 on opposite sides of the Self-Measuring Wall Box Bracket 100. The critical vertical screw hole spacing dimension 194 is the vertical distance between the screw holes 140 on the same side of the Self-Measuring Wall Box Bracket 100. For instance, for a specified stud spacing of sixteen inches and a critical specified outlet height dimension 196 of eighteen inches, the critical width dimension 190 is fifteen and five-eighths inches, the critical horizontal screw hole spacing dimension 192 is fifteen and one-eighth inches, and the critical vertical screw hole spacing dimension 194 is five and one-fourth inches.

In further detail, referring now to FIG. 5, FIG. 6, FIG. 7, FIG. 8, FIG. 9, FIG. 10, and FIG. 11, a sequence of events are depicted, which describe the mounting of a Self-Measuring Wall Box Bracket 100. To install a Self-Measuring Wall Box Bracket 100 between a first wall stud 170 and a second wall stud 175, the Self-Measuring Wall Box Bracket 100 is first turned sideways so that the long sides 205 of the rectangular body frame 110 are vertical and a long trapezoidal side 225 of the bracket, which is now horizontal, is set on the floor 160, as shown in FIG. 5 and FIG. 8. Next, a vertical long side 205 of the Self-Measuring Wall Box Bracket 100 is aligned with a first wall stud 170 with the rectangular body frame 110 positioned between the first wall stud 170 and the second wall stud 175 where the electrical outlet box 125 is to be mounted. Slits 150 located at the base of each ear 130 on the top and bottom edges of the rectangular body frame 110 help an installer to align the vertical bottom edge of the sideways Self-Measuring Wall Box Bracket 100 with the first wall stud 170. Next, a screw 145 is loosely secured through the screw hole 140 in the uppermost ear 130 that overlaps the first wall stud 170, as shown in FIG. 5 and FIG. 8. The coplanar perpendicular distance 250 from the long trapezoidal side 225 set on the floor 160 to the screw hole 140 on the opposite side of the apparatus corresponds to the height of the first mounting point. Next, the Self-Measuring Wall Box Bracket 100 is swung upward, as shown in FIG. 6 and FIG. 9, pivoting around the loosely secured screw 145, until the ears 130 on the opposite side of the loosely secured screw 145 overlaps the second wall stud 175, as shown in FIG. 7 and FIG. 10. Next, the slits 150 are used to assure the horizontal alignment of the Self-Measuring Wall Box Bracket 100 relative to the second wall stud 175, and screws 145 are added to the remaining screw holes 140 and tightly affixed, along with the initial screw 145, so that the Self-Measuring Wall Box Bracket 100 is firmly mounted between the first wall stud 170 and the second wall stud 175, as shown in FIG. 11. The position of the ears 130 and screw holes 140 relative to the mounting frame 120 are precisely set so that an electrical outlet box 125 mounted within the mounting frame 120 is positioned with its center at the required height, which is the coplanar perpendicular distance 250 that is between a long trapezoidal side 225 and a screw hole 140 on the opposite side of the apparatus plus the midpoint distance 255 that is one-half the distance between the screw holes 140 on the same trapezoidal end 210, which is also the critical specified outlet height dimension 196, when the Self-Measuring Wall Box Bracket 100 is properly mounted, as shown in FIG. 11.

In further detail, referring now to FIG. 12, FIG. 13, FIG. 14, FIG. 15, FIG. 16, FIG. 17, and FIG. 18, a sequence of events are depicted, which describe the mounting of a Self-Measuring Wall Box Bracket 100, which has an electrical outlet box 125 mounted in the outlet box mounting frame 120 prior to the installation of the bracket. To install a Self-Measuring Wall Box Bracket 100 with a premounted electrical outlet box 125 between a first wall stud 170 and a second wall stud 175, the Self-Measuring Wall Box Bracket 100 is first turned sideways so that the long sides 205 of the rectangular body frame 110 are vertical and a long trapezoidal side 225 of the bracket, which is now horizontal, is set on the floor 160, as shown in FIG. 12 and FIG. 15. Next, a vertical long side 205 of the Self-Measuring Wall Box Bracket 100 is aligned with a first wall stud 170 with the rectangular body frame 110 positioned between the first wall stud 170 and the second wall stud 175. Slits 150 located at the base of each ear 130 on the top and bottom edges of the rectangular body frame 110 help an installer to align the vertical bottom edge of the sideways Self-Measuring Wall Box Bracket 100 with the first wall stud 170. Next, a screw 145 is loosely secured through the screw hole 140 in the uppermost ear 130 that overlaps the first wall stud 170, as shown in FIGS. 12 and 15. The coplanar perpendicular distance 250 from the long trapezoidal side 225 set on the floor 160 to the screw hole 140 on the opposite side of the apparatus corresponds to the height of the first mounting point. Next, the Self-Measuring Wall Box Bracket 100 is swung upward, as shown in FIG. 13 and FIG. 16, pivoting around the loosely secured screw 145, until the ears 130 on the opposite side of the loosely secured screw 145 overlaps the second wall stud 175, as shown in FIG. 14 and FIG. 17. Next, the slits 150 are used to assure the horizontal alignment of the Self-Measuring Wall Box Bracket 100 relative to the second wall stud 175, and screws 145 are added to the remaining screw holes 140 and tightly affixed, along with the initial screw 145, so that the Self-Measuring Wall Box Bracket 100 is firmly mounted between the first wall stud 170 and the second wall stud 175, as shown in FIG. 18. The position of the ears 130 and screw holes 140 relative to the mounting frame 120 are precisely set so that the electrical outlet box 125 already mounted within the mounting frame 120 is positioned with its center at the required height, which is the coplanar perpendicular distance 250 that is between a long trapezoidal side 225 and a screw hole 140 on the opposite side of the apparatus plus the midpoint distance 255 that is one-half the distance between the screw holes 140 on the same trapezoidal end 210, which is also the critical specified outlet height dimension 196, when the Self-Measuring Wall Box Bracket 100 is properly mounted, as shown in FIG. 18.

The construction details of the invention as shown in FIG. 1, FIG. 2, FIG. 3, FIG. 4, FIG. 5, FIG. 6, FIG. 7, FIG. 8, FIG. 9, FIG. 10, FIG. 11, FIG. 12, FIG. 13, FIG. 14, FIG. 15, FIG. 16, FIG. 17, and FIG. 18, are as follows. The most preferred embodiment comprises a singular construction made of a uniform material of sufficient strength to support an electrical outlet box between two wall studs, such as metal, steel, aluminum, metal alloy, wood, plastic, fiberglass, ceramic, composite material, or the like. The materials listed herein are examples only and not intended to limit the scope of the present invention.

The advantages of the present invention include, without limitation, that it provides a low cost apparatus, which may be easily manufactured and which facilitates rapid and convenient installation of electric boxes at specified heights between standard wall studs with specified or standard stud spacing. The singular construction allows for inexpensive and rapid manufacturing of the apparatus. Moreover, the present invention's ability to self-measure allows for the precise installation of a multitude of electrical outlet boxes, enabling installers to be less skilled than those who must separately measure each site where an electrical out let is to be located. Further, the present invention is advantageous in a factory setting in which numerous electrical outlet boxes must be installed in prefabricated walls that are used in construction.

In broad embodiment, the present invention relates generally to a wall bracket for mounting an electrical outlet at a specified height between two wall studs in which the bracket itself is precisely dimensioned so that it can be used to rapidly determine the proper mounting height of the electrical box, as well as, to a method of using the wall bracket to mount an electrical out at a specified height between two wall studs, which have a specified stud spacing.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiments, methods, and examples, but by all embodiments and methods that are within the scope and spirit of the invention as claimed.

What is claimed is:

1. An apparatus for determining a specified outlet height for mounting an electrical outlet between a first wall stud and a second wall stud, which are spaced apart at a specified stud spacing distance, said apparatus being horizontally symmetrical and vertically symmetrical, said apparatus comprising:
   a rectangular body frame, said rectangular body frame comprising:
      two long sides,
      two short sides, each said short side being shorter than said long sides, coplanar with said long sides, perpendicular to said long sides and spanning a distance between said two long sides, each said short side comprising
         a short vertex on either end of said short side, and
      an outlet box mounting frame for receiving said electrical outlet, said outlet box mounting frame comprising
         an opening in said rectangular body frame; and
   two trapezoidal ends, each said trapezoidal end distending outwardly from one said short side of said rectangular body frame, each trapezoidal end comprising
      one said short side of said rectangular body frame,
      a long trapezoidal side, said long trapezoidal side being longer than said short side, parallel to said short side, said long trapezoidal side comprising
         a long vertex on either end of said long trapezoidal side and
         an outer edge of said apparatus,
      an altitude, said altitude comprising an altitude distance between said short side and said long trapezoidal side,
      two ears, each said ear comprising
         an area spanning said long vertex, said short vertex and the point at which said altitude extending from said short vertex intersects said long trapezoidal side, on the same side of said trapezoidal end, and
         a single screw hole,
      alignment slits at the base of each said ear and at either end of said long sides, and
      depth folds, which allow said electrical outlet to be mounted flush with a wall supported by said first wall stud and said second wall stud;
   wherein said screw holes comprise
      a first mounting point;
   wherein a coplanar perpendicular distance from said long trapezoidal side to said screw hole on the opposite side of said apparatus corresponds to the height of said first mounting point;
   wherein the spacing between the midpoint between said screw holes on one said trapezoidal end and the midpoint between said screw holes on the other said trapezoidal end allows for said apparatus to span said specified stud spacing distance;
   wherein said coplanar perpendicular distance from said long trapezoidal side to said screw holes on the opposite side of said apparatus plus one-half the distance between said screw holes on the same said trapezoidal end is said specified outlet height.

2. The apparatus of claim 1, comprising a singular construction.

3. The apparatus of claim 1, wherein said specified outlet height is eighteen inches, the distance between said screw holes on the same said trapezoidal end is five and one-fourth inches, the spacing between the midpoint between said screw holes on one said trapezoidal end and the midpoint between said screw holes on the other said trapezoidal end is fifteen and one-eighth inches, and the distance between said long trapezoidal sides of said trapezoidal ends of said apparatus is fifteen and five-eighths inches.

4. The apparatus of claim 1, wherein said electrical outlet is configured to be mounted to said outlet box mounting frame prior to installation of said apparatus.

5. A method of determining a specified outlet height for installing an electrical outlet between a first wall stud and a second wall stud, which are spaced apart at a specified stud spacing distance, using an apparatus comprising:
- a rectangular body frame, said rectangular body frame being horizontally symmetrical and vertically symmetrical, said rectangular body frame comprising:
  - two long side edges,
  - two short side edges, said short side edges being shorter than said long side edges,
  - an outlet box mounting frame for receiving said electrical outlet, said outlet box mounting frame comprising
    - an opening in said rectangular body frame, and
    - ears that extend outwardly from each corner of said rectangular body frame, said ears comprising a single screw hole each;
  - wherein the spacing between said screw holes on opposite sides of said long side edges of said rectangular body frame allows for said apparatus to span said specified stud spacing distance;
  - wherein a distance between said screw holes and said short side edge on the opposite side of said apparatus plus one-half the vertical distance between said screw holes is said specified outlet height;

said method comprising:
- turning said apparatus sideways so that said long side edges of said rectangular body frame are vertical and said short side edges of said rectangular body frame are horizontal;
- setting one said short side edge of said rectangular body frame on the floor;
- aligning one said long side edge of said rectangular body frame with said first wall stud with said rectangular body frame positioned between said first wall stud and said second wall stud;
- loosely securing a first screw in said screw hole in the uppermost said ear that overlaps said first wall stud;
- swinging said apparatus upward, pivoting said apparatus around said loosely secured first screw, until said ears on the opposite side of said loosely secured screw overlaps said second wall stud;
- horizontally aligning said apparatus relative to said second wall stud;
- adding additional screws to the remaining said screw holes;
- tightly affixing said first screw and said additional screws, so that said apparatus is firmly mounted between said first wall stud and said second wall stud; and
- mounting said electrical outlet in said outlet box mounting frame.

6. A method of determining a specified outlet height for installing an electrical outlet between a first wall stud and a second wall stud, which are spaced apart at a specified stud spacing distance, using an apparatus comprising:
- a rectangular body frame, said rectangular body frame being horizontally symmetrical and vertically symmetrical, said rectangular body frame comprising:
  - two long side edges,
  - two short side edges, said short side edges being shorter than said long sides edges,
  - an outlet box mounting frame for receiving said electrical outlet, said outlet box mounting frame comprising
    - an opening in said rectangular body frame, and
    - ears that extend outwardly from each corner of said rectangular body frame, said ears comprising a single screw hole each;
  - wherein a space between said screw holes on opposite sides of said long side edges of said rectangular body frame allows for said apparatus to span said specified stud spacing distance;
  - wherein a distance between said screw holes and said short side edge on the opposite side of said apparatus plus one-half the vertical distance between said screw holes is said specified outlet height;

said method comprising:
- configuring said apparatus with said electrical outlet mounted in said outlet box mounting frame;
- turning said apparatus sideways so that said long side edges of said rectangular body frame are vertical, said short side edges of said rectangular body frame are horizontal and said electrical outlet is oriented perpendicular to the final installation position of said electrical outlet;
- setting one said short side edge of said rectangular body frame on the floor;
- aligning one said long side edge of said rectangular body frame with said first wall stud with said rectangular body frame positioned between said first wall stud and said second wall stud;
- loosely securing a first screw in said screw hole in the uppermost said ear that overlaps said first wall stud;
- swinging said apparatus upward, pivoting said apparatus around said loosely secured first screw, until said ears on the opposite side of said loosely secured screw overlaps said second wall stud;
- horizontally aligning said apparatus relative to said second wall stud so that said mounted electrical outlet is oriented in said final installation position;
- adding additional screws to the remaining said screw holes; and
- tightly affixing said first screw and said additional screws, so that said apparatus is firmly mounted between said first wall stud and said second wall stud.

* * * * *